No. 4,329. REISSUED APR. 11, 1871.

J. T. CASE.

WATER WHEEL.

Inventor,

Joel. T. Case

Witnesses,

James Shepard

C. A. Shepard

THE NORRIS PETERS CO., PHOTO-LITHO., WASHINGTON, D. C.

UNITED STATES PATENT OFFICE.

JOEL T. CASE, OF BRISTOL, CONNECTICUT, ASSIGNOR TO THE NATIONAL WATER WHEEL COMPANY.

IMPROVEMENT IN WATER-WHEELS.

Specification forming part of Letters Patent No. 108,757, dated November 1, 1870; Reissue No. 4,329, dated April 11, 1871.

DIVISION A.

*To all whom it may concern:*

Be it known that I, JOEL T. CASE, of Bristol, in the county of Hartford and State of Connecticut, have invented certain new and useful Improvements in Water-Wheels, of which the following is a specification.

My invention consists of the peculiar construction and arrangement of the buckets, as hereinafter described.

Figure 1:
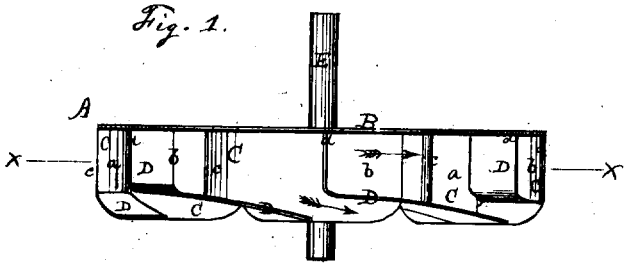
Figure 2:
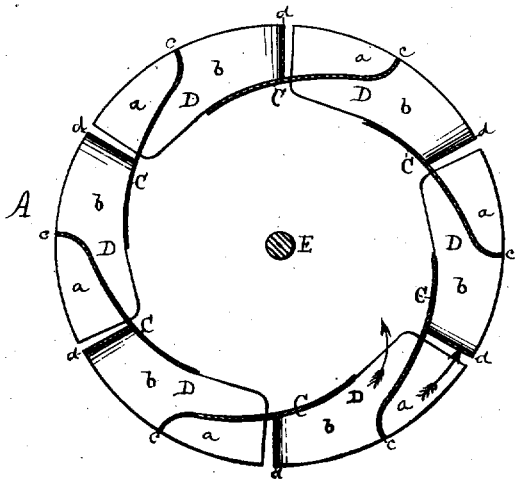
Figure 3:
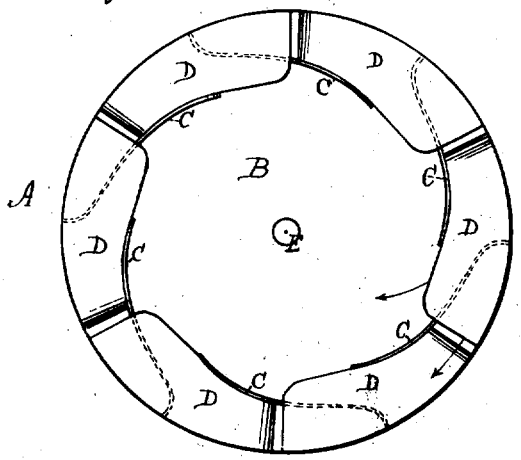

In the accompanying drawings, Figure 1 is a side elevation of a wheel of my invention. Fig. 2 is a horizontal section of the same on line *x x*, and Fig. 3 is a plan view of the under side of the same.

In the manufacture of my invention the wheel, as a whole, (with the exception of its shaft,) will be cast in one piece; but for convenience of description I will refer to it as if made in several parts.

A designates the wheel proper, and B the top plate, to which the buckets *a b* are secured. These buckets are composed of two parts, C D. The part C is secured to the top plate, B, in a vertical position, (or nearly so,) and with its outer end curved, as shown at *c*, so as to form the end of the bucket *a*, from which point the part C extends inwardly and eccentrically to the wheel A sufficiently far to form the back of two buckets, *a b*. The part D has one end, *d*, secured to the top plate, B, and extends downward from said plate far enough to form the end and depth of the bucket *b*, from which point its outer edge follows in line with the periphery of the top plate, B, (but gradually descending,) for a distance equal to the length of two buckets, and thus forms the bottom of the buckets *a b*. The inner edge of the part D is fitted closely to the part C so far as it follows the same. The buckets are thus interlocked until the wheel A is complete. The wheel A is secured to the shaft E, and is designed to be suspended by proper bearings in a vertical position, and incased by a series of chutes in any of the ordinary modes of hanging turbine wheels. The water is discharged from the buckets, as indicated by darts in the several figures. The bucket *a* discharges directly under the succeeding bucket *b*, which bucket *b* discharges from its inside end toward the shaft E. Thus every alternate bucket *a b* has respectively a bottom and central discharge, while the mouths or inlets of all the buckets are substantially on the same line around the wheel A.

I claim as my invention—

The wheel A with its buckets *a b*, having respectively a downward and central discharge, and arranged alternately, substantially as described

JOEL T. CASE.

Witnesses:

JAMES SHEPARD,

C. A. SHEPARD.